United States Patent [19]

Meldrum et al.

[11] Patent Number: 5,432,706
[45] Date of Patent: Jul. 11, 1995

[54] MULTIMETER HAVING MIN/MAX TIME STAMP

[75] Inventors: Glen A. Meldrum, Mountlake Terrace; Alan W. McRobert, Kirkland; Robert M. Greenberg, Marysville, all of Wash.

[73] Assignee: John Fluke Mfg. Co., Inc., Everett, Wash.

[21] Appl. No.: 811

[22] Filed: Jan. 5, 1993

Related U.S. Application Data

[63] Continuation of Ser. No. 666,354, Mar. 8, 1991, abandoned.

[51] Int. Cl.⁶ ............... G01R 19/165; G01R 19/30
[52] U.S. Cl. ............................ 364/481; 364/550
[58] Field of Search ............... 328/151; 340/799; 364/481, 550, 569; 377/20

[56] References Cited

U.S. PATENT DOCUMENTS

| | | | |
|---|---|---|---|
| 3,631,410 | 12/1971 | Velasco | 365/96 |
| 4,143,365 | 3/1979 | Cayzac et al. | 340/799 X |
| 4,286,465 | 9/1981 | Thomae | 364/557 X |
| 4,372,692 | 2/1983 | Thomae | 364/557 X |
| 4,400,783 | 8/1983 | Locke, Jr. et al. | 364/483 |
| 4,514,835 | 4/1985 | Böttigheimer et al. | 368/118 |
| 4,782,455 | 11/1988 | Morinouchi et al. | 364/569 |
| 5,155,693 | 10/1992 | Altmayer et al. | 364/419 X |

FOREIGN PATENT DOCUMENTS

| | | |
|---|---|---|
| 3519908 | 12/1986 | Germany . |
| 3837592 | 5/1990 | Germany . |

*Primary Examiner*—Edward R. Cosimano
*Attorney, Agent, or Firm*—John P. Dellett

[57] ABSTRACT

A min/max time stamp for a multimeter provides display of minimum and maximum measured values recorded since enabling a min/max function. The minimum and maximum values, as well as a present value, may be displayed, together with the relative or absolute time at which the measured minimum or maximum occurred. An alert signal is generated to indicate a new maximum or a new minimum measurement.

17 Claims, 8 Drawing Sheets

MULTIMETER HAVING MIN/MAX TIME STAMP

This is a continuation of application Ser. No. 07/666,354 filed Mar. 8, 1991 and now abandoned.

BACKGROUND OF THE INVENTION

The present invention relates to multimeters and particularly to multimeters for recording and displaying minimum and maximum readings as well as the time of occurrence of such readings.

Technicians repairing and debugging electrical equipment often wish to measure minimum and maximum values of voltage, resistance and the like at various points within a circuit or device under test. In addition it is helpful to know the time when a minimum or maximum value took place. Heretofore it has been necessary to observe the measurement instrument and manually record the minimum and maximum values as well as the times at which those values occurred. Such a method is undesirable in that the technician must remain at the location of the measuring instrument and monitor the operation thereof. Further, if the minimum or maximum event occurs for a short time span, it might pass unobserved. Thus the technician may miss the event while away from the work area or during a moment of inattention.

The minimum or maximum event may take place on an irregular basis or after an extended period of equipment operation, requiring long, tedious observation stints while awaiting the event, at which time the technician is hindered from undertaking other tasks and more efficiently using his time. The technician may also wish to determine minimum/maximum event times relative to a second event, e.g. initial device power-up. Heretofore, such a determination has required recording starting time and subsequently manually calculating relative elapsed time after noting the times for minimum/maximum events. It would be desirable to determine minimum and maximum values and the times when the minimum and maximum values were measured, without requiring constant observation and manual recording.

An alternate method of recording minimum/maximum event information involves using a data logging device. However, typical data logging devices have drawbacks. Currently available devices require setting event trigger values, and do not record and time stamp data unless the measured parameter exceeds a preset event trigger limit. This limitation requires an operator to have some knowledge of the approximate limit values before beginning measurement, often a difficult task when troubleshooting equipment problems of unknown origin. Improperly choosing a limit can result in no meaningful data being obtained if the limit is too high. If too low, then too much data is recorded. Further, data logging devices are relatively large and cumbersome and it would be desirable to provide a handheld device capable of recording maximum and minimum values as well as the times when those values occur red.

SUMMARY OF THE INVENTION

The present invention relates to an instrument such as a digital multimeter including analog data acquisition circuitry for converting measured values into digital data for interpretation and storage by a microprocessor. The multimeter has the capability of storing minimum and maximum measurement values as well as the capability of displaying measured minimum, maximum and current values. The system also is adapted to record the time when a minimum or maximum event occurs. The time value can be either relative to a particular time or can be the absolute time (e.g. time of day) when the event in question took place.

The instrument according to the present invention can display minimum and maximum values in a sequential manner by scrolling a display through minimum value, time measured, maximum value, time measured, and current measured value. An alert signal indicates when an update of either the minimum or maximum value takes place.

It is accordingly an object of the present invention to provide an improved time stamp method and apparatus for indicating when an event occurred.

It is another object of the invention to provide an improved multimeter for recording and displaying minimum measured value, maximum measured value and their times of measurement.

It is another object of the present invention to provide an improved method and apparatus for displaying measured values, times of measurement and current measurement values.

It is another object of the present invention to provide a time stamping measurement device in a handheld package.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DESCRIPTION OF THE PREFERRED EMBODIMENT

Figure 1A:
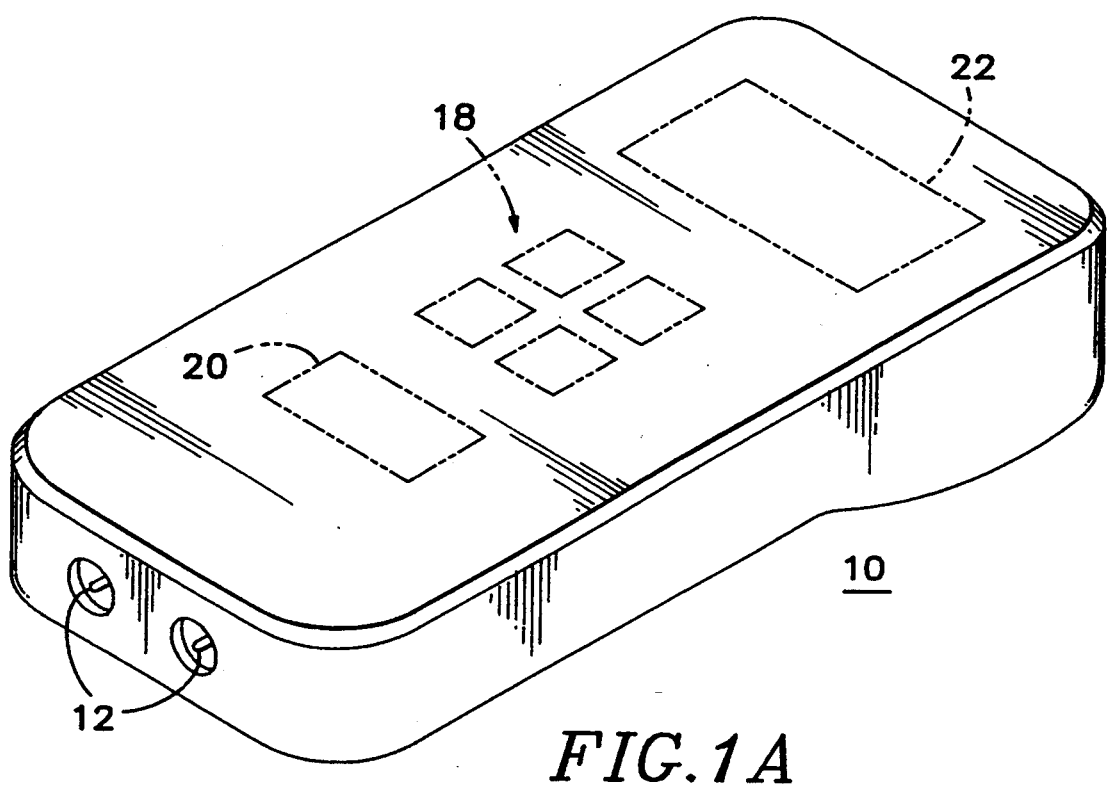
FIG. 1A is a perspective view of a handheld digital multimeter according to the present invention.

Referring now to FIG. 1A, a perspective view of a hand held digital multimeter in accordance with the present invention, multimeter 10 is provided with input connectors 12 extending to an end of the meter case and which connect to test leads (not illustrated) for coupling the meter to a device under test. Centrally disposed along the top face of the meter is a key pad 18, comprising four keys in the illustrated embodiment. A function selector 20, which serves to allow the meter operator to choose various meter functions, is installed on the top face of the meter adjacent the key pad and comprises, for example, a multiple position slide switch. On the opposite side of the key pad from the function selector is display 22, suitably comprising a liquid crystal display.

Figure 1B:
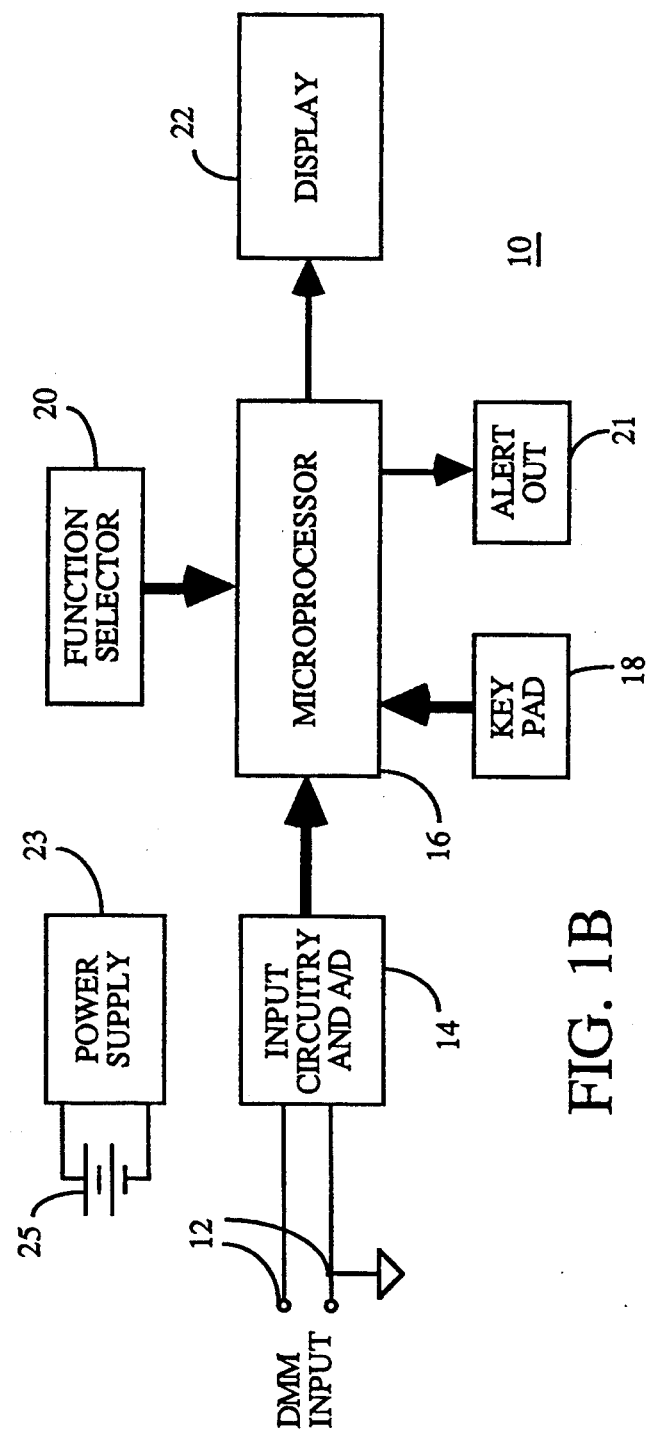
FIG. 1B is a block diagram of a digital multimeter in accordance with the present invention.

Referring to FIG. 1B, comprising a block diagram of a digital multimeter 10 in accordance with the present invention, multimeter inputs 12 are coupled to input circuitry and A to D converter 14 that generates a digital representation of the analog signal presented at the inputs. Microprocessor 16, which reads the digital output of converter 14 for processing, is provided with random access memory, read only memory and clock circuitry. The microprocessor also receives input from keypad 18 as well as from function selector 20, which are operative to control various functions of the multimeter. Microprocessor 16 supplies data to alert output module 21 for generating an alert signal during operation wherein this alert signal may comprise an audible tone. The microprocessor further supplies display data to display 22 in order to provide visual readout of measurement values and times. Power supply 23 including battery 25 supplies power to the various circuits of the multimeter. In operation, the multimeter performs measurements on a programmed, cyclical basis, periodically sampling signals at the input and converting them from analog to digital form for processing and display.

Figure 2:
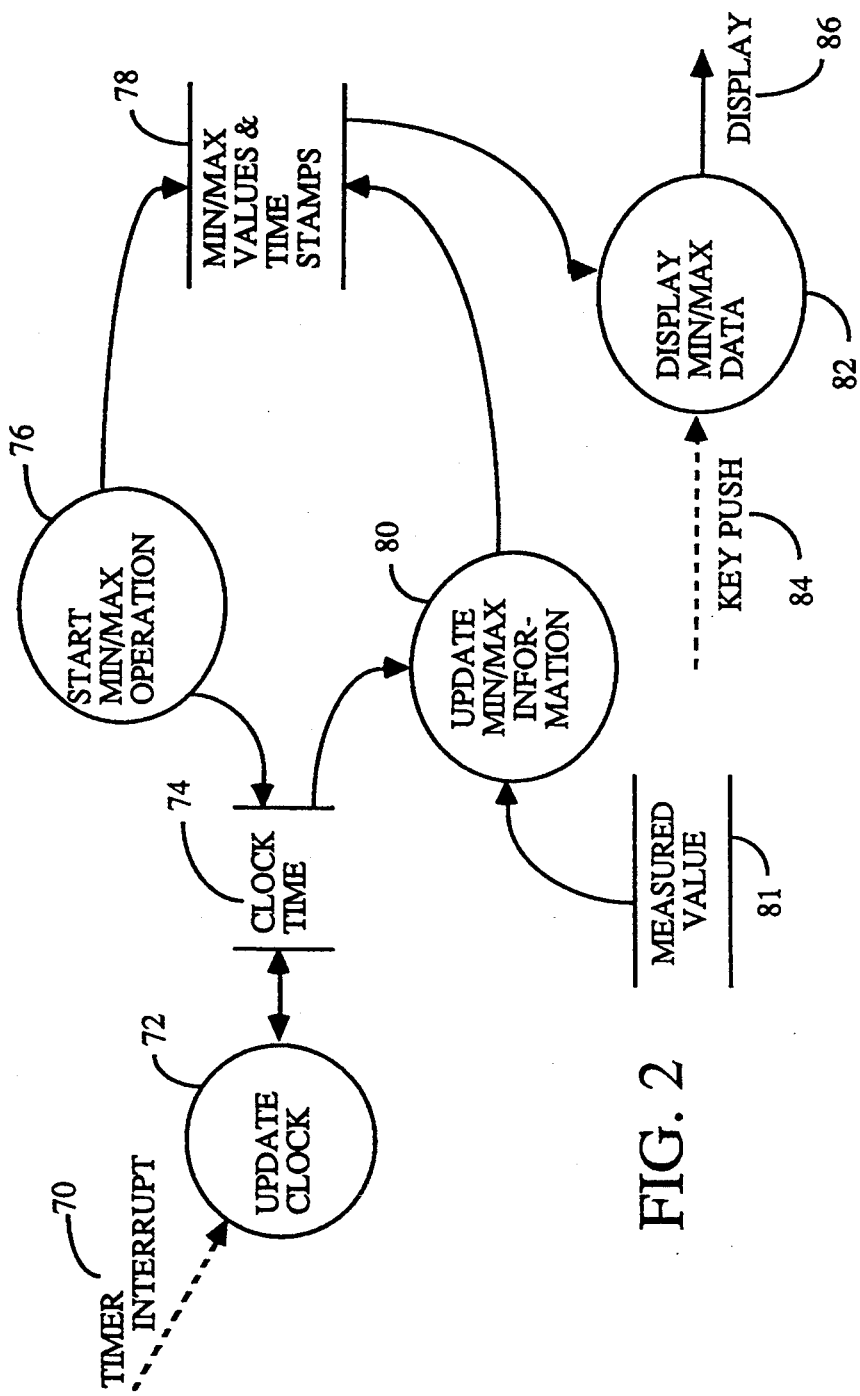
FIG. 2 is a data flow and control flow diagram for min/max time stamping according to the present invention.

Referring now to FIG. 2, comprising a combined data flow and control diagram for min/max time stamp operation of the microprocessor, a timer interrupt 70 occurs at regular intervals and is received by update clock process 72. The update clock process provides the current time for the clock time 74 and does so by retrieving and storing clock times in relation to occurrence of the timer interrupt. Clock time 74 may, however, be set initially by the start min/max operation process 76, and process 76 can also set min/max values and time stamps 78. Min/max values and time stamps 78 store the measured minimum and maximum values together with the clock times when those values were measured. Update min/max information process 80 receives clock time 74 as well as measured value 81 (the current value supplied by input circuitry and A/D 14) and provides measurement values and clock times for min/max values and time stamps 78. These min/max values and time stamps also supply the display min/max data process 82 which is responsive to key push data 84 and generates display data output 86 for presentation on display 22 in FIG. 1A and FIG. 1B.

Figure 3:
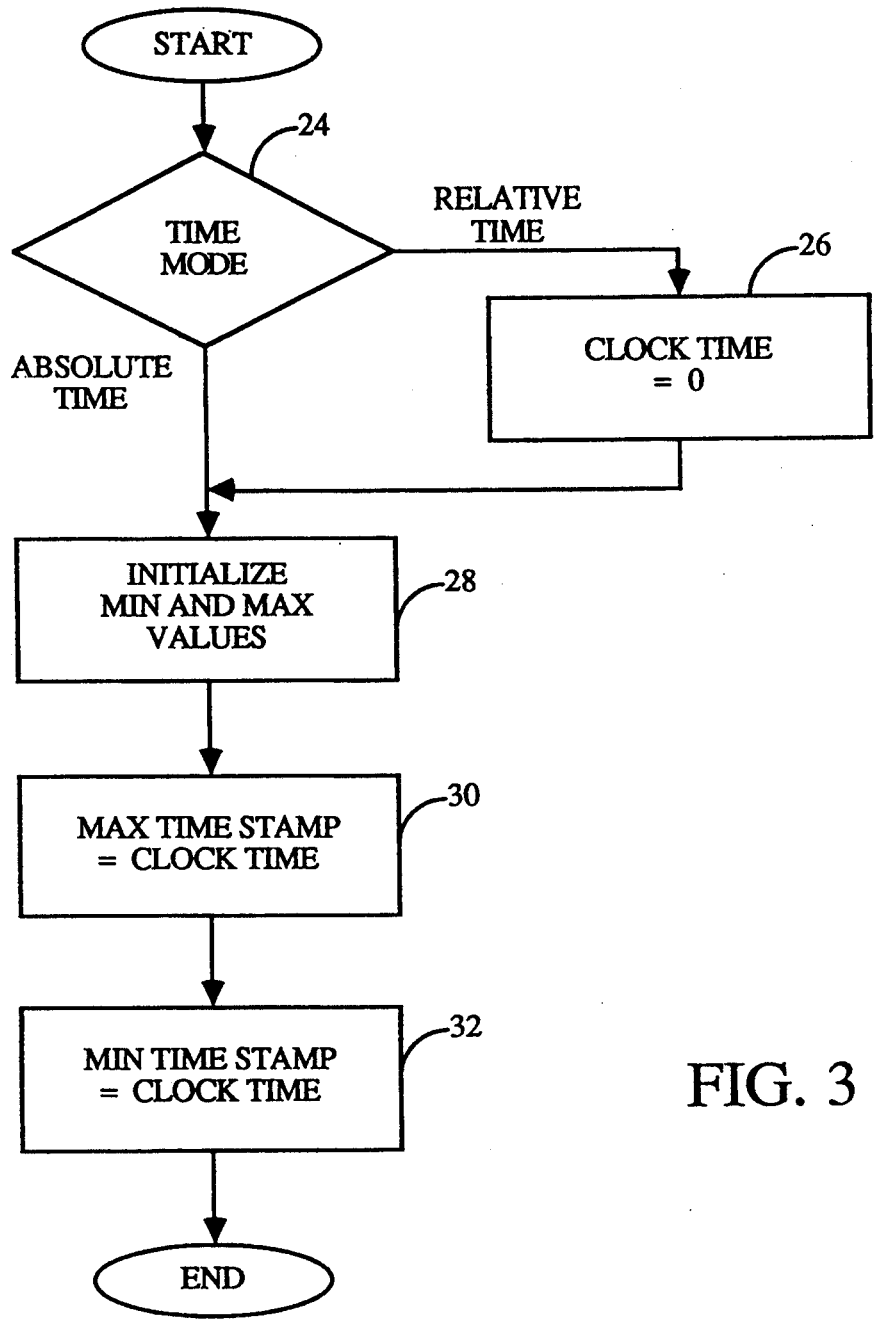
FIG. 3 is a flow chart of the start minimum/maximum operation process of a multimeter in accordance with the present invention.

Referring now to FIG. 3, comprising a flow chart for the start min/max operation process 76 of FIG. 2, the initialization of the min/max time stamping will be described. Min/max mode is selected, for example, by operation of keypad 18. Upon selection of the min/max mode, the program of FIG. 3 enters decision block 24 to determine the time mode chosen, relative time or absolute time. If the selection is relative time, wherein all min/max values are time stamped relative to the time when the min/max mode operation was initiated, the process enters block 26 wherein clock time is set to zero, or some other relative initialization value. Thereupon the process proceeds to block 28, initializing the minimum and maximum values in memory (setting them, for example, to be the currently measured value at the DMM inputs 12 of FIG. 1A and FIG. 1B). However, if at decision block 24 the time mode is absolute time mode, the process proceeds directly to initialize minimum and maximum values block 28 without clearing the clock time, ensuring that any future references to the clock time produce an absolute time value. The clock may comprise, for example, a time of day representation. After initializing minimum and maximum values, the process continues with block 30 for setting the maximum time stamp equal to the current clock time and then to block 32 wherein the minimum time stamp is set equal to the clock time, after which the process ends. As an alternative, in an absolute time mode, the minimum time stamp and maximum time stamp can be initialized with a value that indicates that no update of the minimum or maximum value has occurred since the start of min/max operation.

Figure 4:
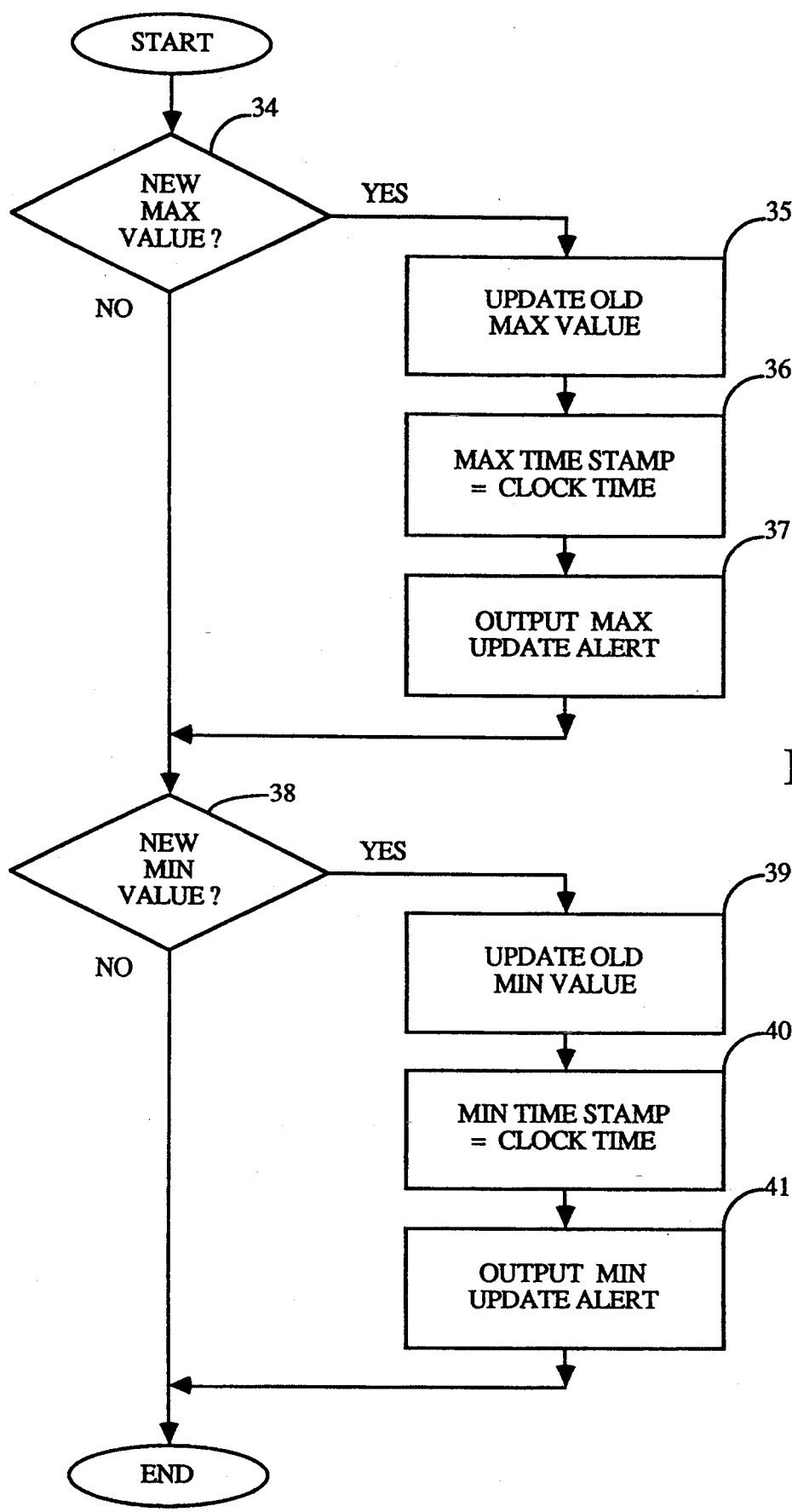
FIG. 4 is a flow chart of the update min/max information process in accordance with the present invention.

Once initialization is complete, the device proceeds with measuring and displaying the values provided at the DMM inputs 12 (FIGS. 1A and 1B). During each measurement cycle, the microprocessor operates in accordance with the FIG. 4 flow chart of the update min/max information process 80 of FIG. 2. The newly measured value 81 (FIG. 2) is examined at decision block 34 to determine if the value is a new maximum value, i.e., if the present measured value is greater than the previously stored, highest measured value. If the current measurement is a new maximum value, the process proceeds to block 35 to "update old max value" wherein the currently measured value replaces the previously stored maximum value. Next, in process block 36, in order to record the time when the maximum occurred the maximum time stamp is set to the current value of clock time, and the "output max update alert" step (block 37) directs the microprocessor to send a signal to alert output module 21 (FIG. 1B) for notifying the meter user that a new maximum value has been recorded.

When the update has occurred, the process continues with decision block 38. (If the result of the test in decision block 34 was that a new maximum value had not been measured, then the process proceeds directly to decision block 38 without executing steps 35, 36 and 37.) In decision block 38, examining the measured value determines if a new minimum value has been measured, i.e., if the current value is less than the previously lowest measured and stored value. If the value is not a new minimum, this process ends, but if the measurement is a new minimum value, block 39 is executed wherein the presently measured value updates the stored minimum value, while in block 40, the minimum time stamp is set to the current clock time. Again, in a manner similar to the case of a new maximum value, the "output min update alert" step 41 directs the microprocessor to signal output module 21 for generating an alert signal to the meter user that a new minimum value has been recorded. The generate max update alert step 37 and generate min update alert step 41 may comprise, for example, generation of audible tones through alert output 21 of FIG. 1B wherein the tones may differ depending upon which step is being executed to allow an operator to identify the particular alert condition. The process, having updated the maximum and minimum values and times, returns to await another periodic measurement cycle.

Figure 5:
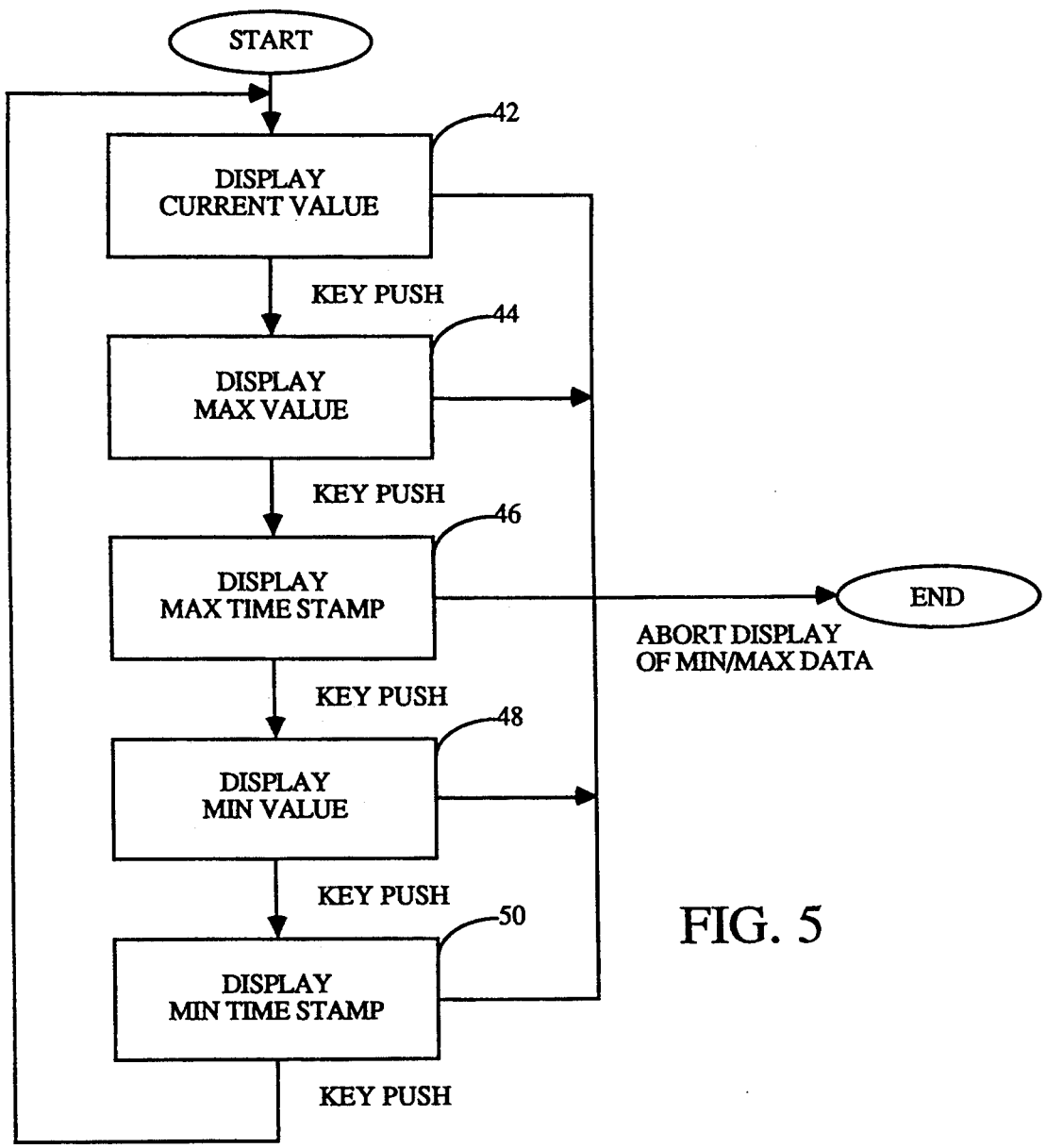
FIG. 5 is a state diagram for the displaying of min/max data process for a single key scrolling embodiment of the present invention.

FIG. 5 comprises a state diagram of the display minimum/maximum data process 82 of FIG. 2, in an embodiment of the present invention utilizing a single key on keypad 18 of FIGS. 1A and 1B to enable scrolling through the recorded data. The process starts by displaying the current measured value in block 42 (on display 22 of FIGS. 1A and 1B). The display state will remain at block 42 until an appropriate key (a scroll key) is pushed on keypad 18 (FIG. 1) whereupon the process will enter state block 44, for displaying the maximum measured value. After another press of the scroll key, the process then displays (block 46) the maximum time stamp, showing either the absolute or relative time (depending upon which time mode was selected in accordance with FIG. 3). Still another key push will cause the display to enter state 48 wherein the minimum value is displayed. When the key is pushed again, state 50 is entered whereupon the minimum time stamp is displayed for the point in time at which the minimum value was measured. Another key push will return the process to state 42 for displaying the current value. In this manner, the meter operator can scroll the display through the current value and minimum/maximum values as well as times of measurements through use of a single key. At any state of the display, the operator may abort the minimum/maximum display mode, for example, by operating the function selector to exit the minimum/maximum mode or by depressing and holding the scroll key for an extended period of time whereupon the process ends the display of min/max data.

Figure 6:
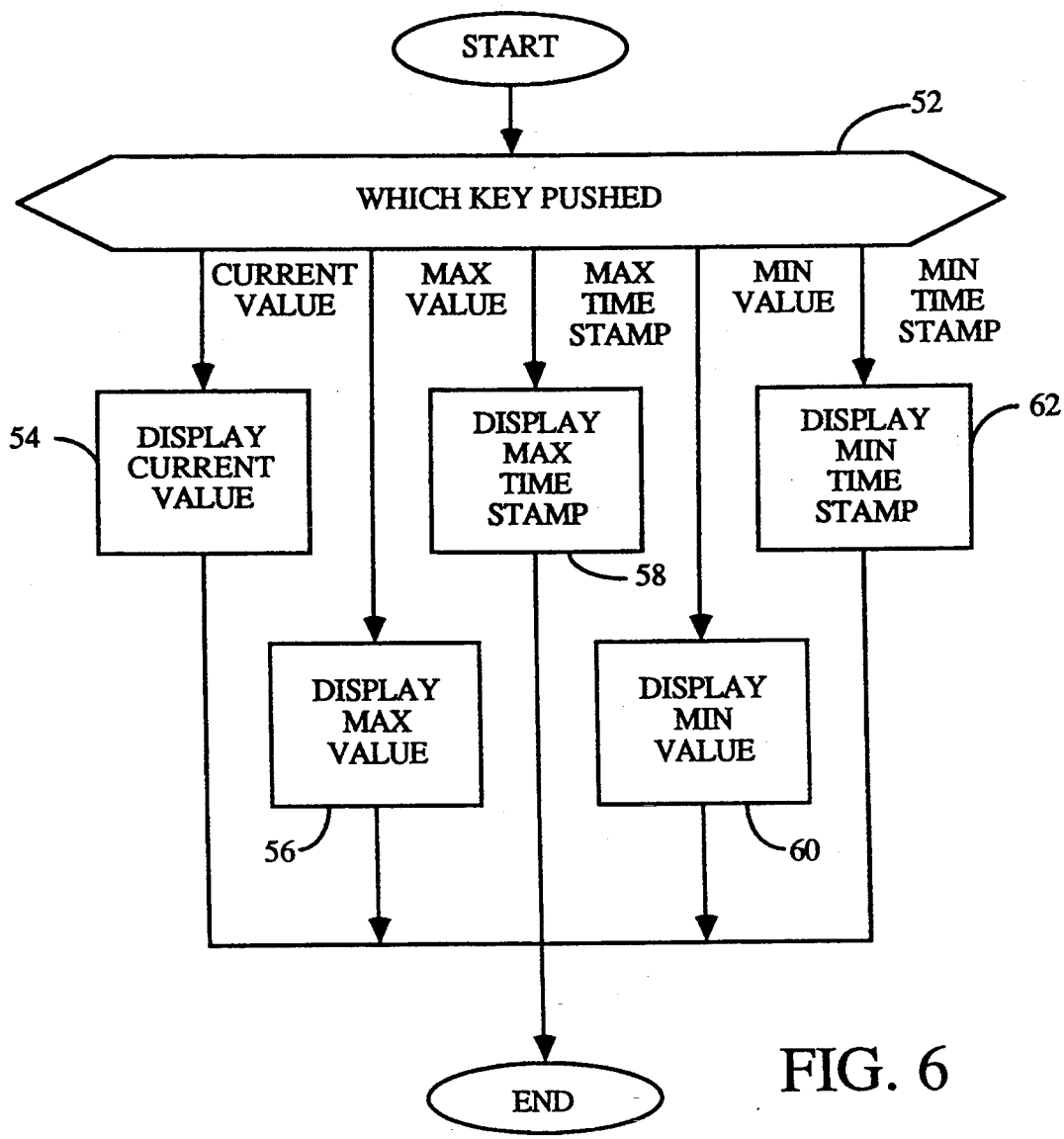
FIG. 6 is a state diagram for the display min/max data process in the case of a multiple key embodiment of the present invention.

Referring now to FIG. 6, a state diagram for displaying minimum/maximum values and time stamps for a multikey system is illustrated as would be implemented when key pad 18 of FIGS. 1A and 1B is provided with multiple keys, each associated with a particular function. The process enters decision block 52 for determining which key has been pushed, and, if a current value key has been selected, the current value is displayed (block 54). If the maximum value key has been depressed, the maximum value appears (block 56). If the operator depresses the maximum time stamp key, the display maximum time stamp block 58 is entered whereby the maximum time stamp is shown. Similarly, depressing the minimum value key will cause the process to enter block 60, display minimum value, and, finally, if the minimum time stamp key is depressed, the minimum time stamp value is provided (block 62). As with blocks 54, 56, 58 and 60, the process is then completed.

Figure 7A:
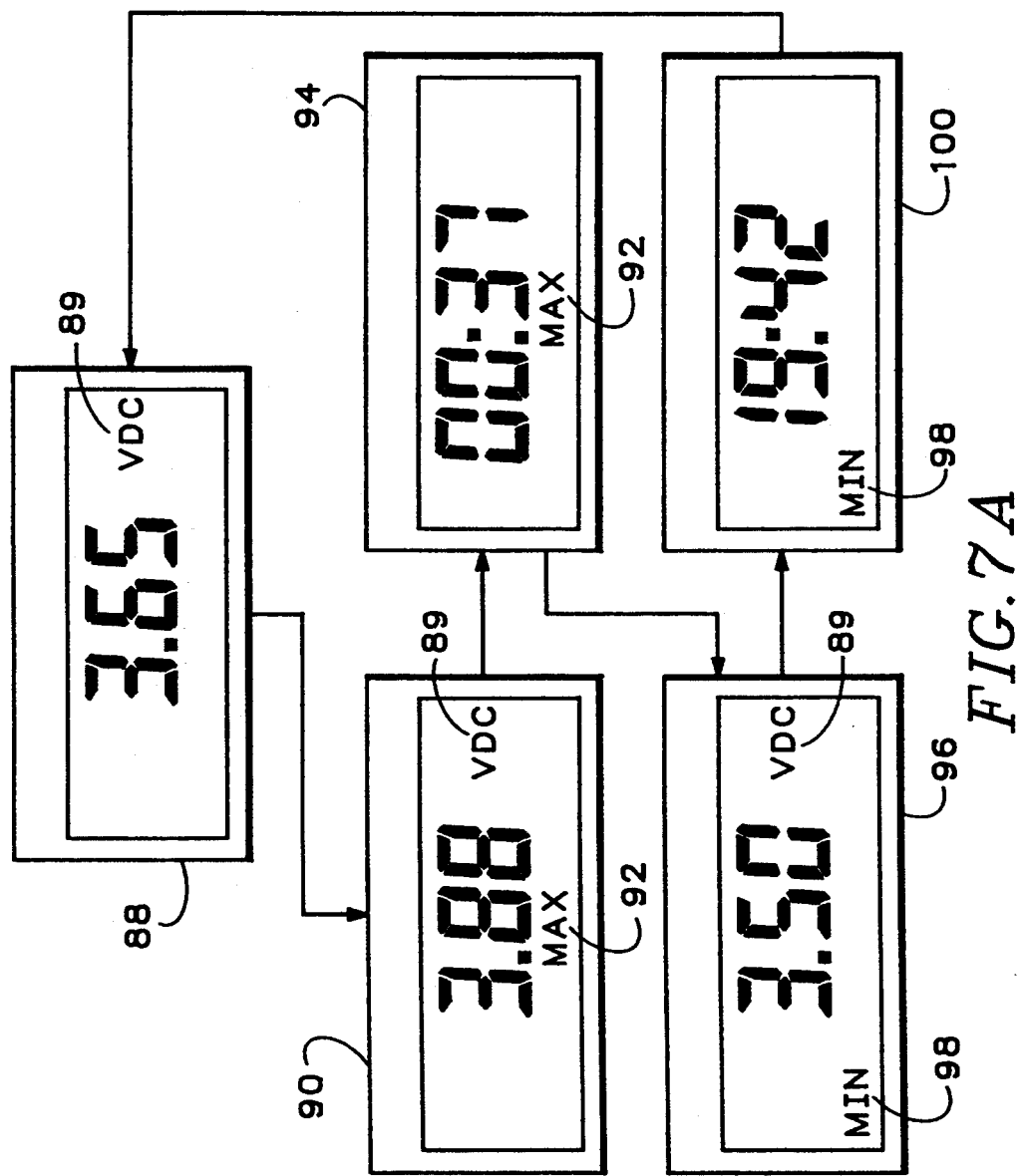
FIG. 7A illustrates an example of a min/max time stamp display sequence in accordance with the present invention.
Figure 7B:
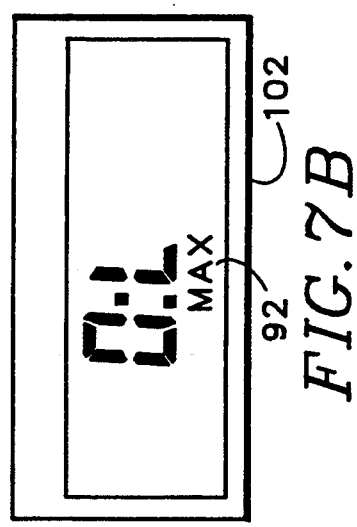
FIG. 7B illustrates an example of the display of a relative time out of range condition.

Referring now to FIG. 7A and FIG. 7B, illustrating configurations as may be generated on display 22 of FIGS. 1A and 1B when using the method as discussed in conjunction with FIG. 5, the currently measured value (in this example DC voltage) is displayed at 88, e.g. 3.65 volts. Unit annunciator 89 indicates that the current value is a DC voltage, while if other measurement units were used, a different unit annunciator would appear (AC volts, ohms, etc.). When the operator presses the key, the display at 90 next appears, showing, for example, 3.88 volts DC, as the maximum measured voltage identified by the "MAX" symbol 92 at the lower center, the unit annunciator 89 also remaining on the display. A subsequent depression of the key results in the display 94, "00:37", showing, for this example, that the maximum value occurred 0 hours and 37 minutes after the monitoring began (assuming a relative time mode). The "MAX" indicator is still shown, to denote that the time stamp is associated with the maximum value. Still another key actuation will result in the display 96 of the minimum voltage, in this case 3.5 volts, while the "MAX" symbol extinguishes and the minimum indicator 98, comprising the word "MIN" in the illustrated embodiment, appears in the lower left hand corner. Unit annunciator 89 reappears to denote the displayed units. Depressing the key again will cause the unit annunciator to be extinguished, while providing display 100, "19:42", which indicates that the minimum measured value occurred 19 hours and 42 minutes after the monitoring began, assuming relative time mode. (Alternatively the absolute time mode could indicate, for example, that the minimum took place at 7:42 p.m.). Pressing the key again cycles the display back to 88, showing the currently measured value and simultaneously extinguishing the minimum indicator 98. Leading zeros are not suppressed for the time mode. Conversely, the displays at 88, 90 and 96 have leading zero suppression, and carry a decimal point between the appropriate digits which does not blink, therefore helping to distinguish between time values (where the colon blinks) and the measured value. FIG. 7B illustrates the time stamp generated in the relative time mode when the time stamp value is out of the range of the display. Display 102 shows an "O:L" (overload). The "MAX" indicator 92 is also illuminated in FIG. 7B to denote that the display is the maximum value time stamp. If the out of range time value were associated with a minimum value, the "MIN" indicator 98 would appear instead.

Although the foregoing description describes the min/max measurement function with time stamping, the min/max function may also be performed without recording the time of occurrence if the operator so desires.

While preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A measurement device comprising:

measurement means for acquiring a signal and for producing a first digital measurement value representative of the signal;

microprocessor means receiving said first measurement value from an output of said measurement means, said microprocessor means operating according to a program adapted to compare said first value with a stored second value representative of a maximum and to replace said stored second value with said first value if said first value represents a maximum relative to said second value, said program also being adapted to compare said first value with a stored third value representative of a minimum and to replace said stored third value with said first value if said first value represents a minimum relative to said third value, said program being further adapted to store a fourth value representative of the time at which said first value that replaced said second stored value was acquired by said measurement means, and to store a fifth value representative of the time at which said first value that replaced said third stored value was acquired by said measurement means; and alert means, said alert means being responsive to a signal supplied by said microprocessor means for indicating that said second value has been replaced with said first value and for indicating that said third value has been replaced with said first value, wherein said program is adapted to direct said microprocessor means to supply a signal to said alert means if said second value has been replaced with said first value or if said third value has been replaced with said first value.

2. A measurement device according to claim 1 further comprising display means receiving data from said microprocessor means for displaying said first, second, third, fourth and fifth values.

3. A measurement device according to claim 1 wherein said alert means comprises audio alert means.

4. A measurement device comprising:
measurement means for acquiring a signal and for producing a first digital measurement value representative of the signal;
microprocessor means receiving said first measurement value from an output of said measurement means,
said microprocessor means operating according to a program adapted to compare said first value with a stored second value representative of a maximum and to replace said stored second value with said first value if said first value represents a maximum relative to said second value, said program also being adapted to compare said first value with a stored third value representative of a minimum and to replace said stored third value with said first value if said first value represents a minimum relative to said third value, said program being further adapted to store a fourth value representative of the time at which said first value that replaced said second stored value was acquired by said measurement means, and to store a fifth value representative of the time at which said first value that replaced said third stored value was acquired by said measurement means; and
function control means in operative relation with said microprocessor means for providing input to said microprocessor means for generating a selection signal for directing operation of said measurement device to enable selection of a minimum/maximum measurement mode and selection between a relative time and an absolute time measurement mode.

5. A method for operating a measurement device comprising the steps of:
cyclically digitizing a signal to acquire a measured value;
determining the time at which said measured value was acquired;
determining if said acquired measured value is a minimum value and if said acquired value is a minimum value, storing said acquired value as a minimum measured value and storing the time at which said minimum measured value was acquired;
generating an alert signal for indicating that a minimum value has been stored;
presenting the generated alert signal for indicating that a minimum value has been stored in a form perceivable by a user of the measurement device;
determining if said acquired measured value is a maximum value and if said acquired value is a maximum value, storing said acquired value as a maximum measured value, and storing the time at which said maximum measured value was acquired;
generating an alert signal for indicating that a maximum value has been stored; and
presenting the generated alert signal for indicating that a maximum value has been stored in a form perceivable by a user of the measurement device.

6. The method according to claim 5 wherein said step of presenting an alert signal for indicating that a minimum value has been stored comprises providing an audio alert signal.

7. The method according to claim 5 wherein said step of presenting an alert signal for indicating that a maximum value has been stored comprises providing an audio alert signal.

8. The method according to claim 5 wherein said step of presenting the generated alert signal for indicating that a minimum value has been stored comprises providing a first audio alert signal and wherein said step of presenting the generated alert signal for indicating that a maximum value has been stored comprises providing a second audio alert signal.

9. The method according to claim 5 further comprising the steps of displaying said stored minimum measured value, displaying said stored time at which said minimum measured value was taken, displaying said stored maximum measured value and displaying said stored time at which said maximum measured value was taken.

10. The method according to claim 9 wherein said displaying steps are performed in a sequential manner, control of said sequential manner being responsive to a display change signal.

11. The method according to claim 9 wherein the order of said display steps is determined by a display selection signal.

12. A method for operating a measurement device comprising the steps of:
cyclically digitizing a signal to acquire a measured value;
determining the time at which said measured value was acquired;
determining if said acquired measured value is a minimum value and if said acquired value is a minimum value, storing said acquired value as a minimum measured value and storing the time at which said minimum measured value was acquired;
determining if said acquired measured value is a maximum value and if said acquired value is a maximum value, storing said acquired value as a maximum measured value, and storing the time at which said maximum measured value was acquired; and
selecting whether said time at which said minimum measured value was acquired and said time at which said maximum measured value was acquired are relative to a specified time or are absolute time, said selecting being responsive to operator actuation of a function control.

13. A hand held digital multimeter comprising:
signal input means for acquiring an input signal;
analog to digital means receiving the output of said signal input means for generating a digital representation of the input signal;
microprocessor means receiving the output of said analog to digital means,
said microprocessor means being provided with a program adapted to determine and record maximum and minimum values received by said microprocessor means from said analog to digital means, said program means being further adapted to record time values at which said minimum and maximum values are recorded; and function control means disposed in operative relation with said microprocessor means for directing operation of said multimeter to enable selection of a minimum/maximum measurement mode and selection between a relative time and an absolute time measurement mode in response to actuation of said function control means an operator.

14. A multimeter in accordance with claim 13 further comprising display means for displaying said recorded maximum and minimum values and said times when said maximum and minimum values are recorded.

15. A multimeter in accordance with claim 13 further including clock means, said clock means providing time values for said program for recording times when said minimum and maximum values are recorded.

16. A hand held digital multimeter comprising:

signal input means for acquiring an input signal;

analog to digital means receiving the output of said signal input means for generating a digital representation of the input signal;

microprocessor means receiving the output of said analog to digital means, said microprocessor means being provided with a program adapted to determine and record maximum and minimum values received by said microprocessor means from said analog to digital means, said program being further adapted to record time values at which said minimum and maximum values are recorded, said program also being adapted to generate a data signal when a new maximum or a new minimum value is recorded; and alert means, said alert means being responsive to said data generated by said program for generating an alert signal when a new maximum or a new minimum value is recorded.

17. A multimeter in accordance with claim 16 wherein said alert means comprises audible alert means for generating an audible signal.

* * * * *